No. 861,691. PATENTED JULY 30, 1907.
C. LE R. ANDERSON.
SPRING WHEEL.
APPLICATION FILED MAR. 19, 1907.
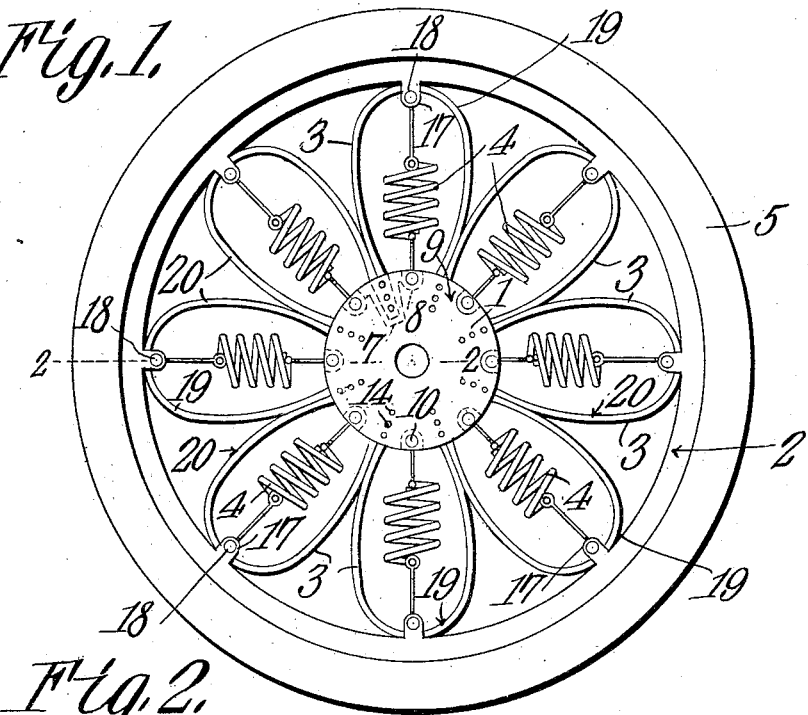
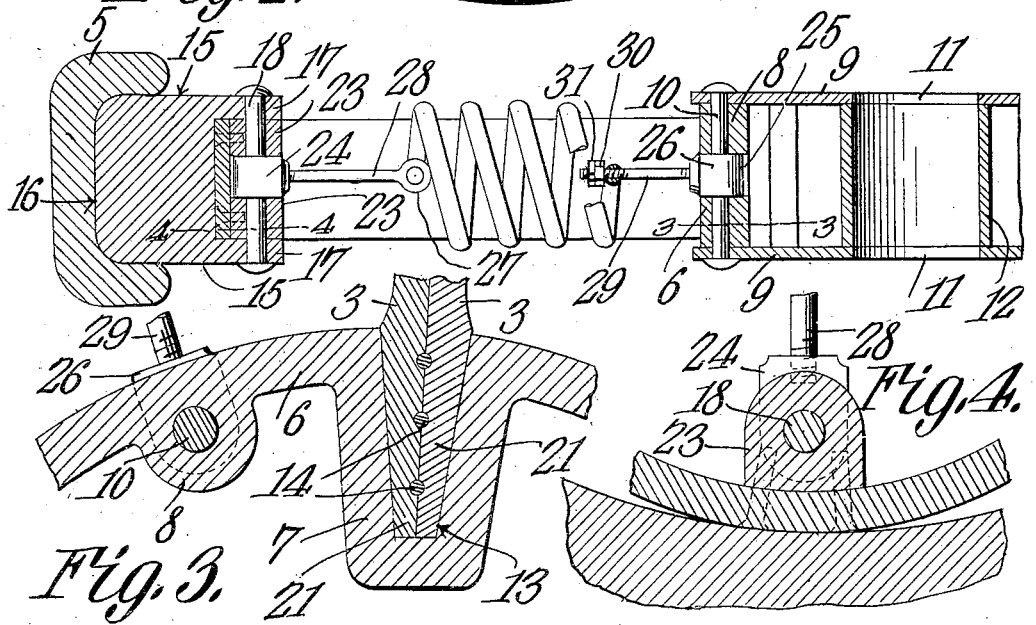
WITNESSES:
Chester LeRoy Anderson
INVENTOR.
By C. A. Snow & Co.
ATTORNEYS

UNITED STATES PATENT OFFICE.

CHESTER LE ROY ANDERSON, OF QUINCY, ILLINOIS.

SPRING-WHEEL.

No. 861,691.   Specification of Letters Patent.   Patented July 30, 1907.

Application filed March 19, 1907. Serial No. 363,197.

*To all whom it may concern:*

Be it known that I, CHESTER LE ROY ANDERSON, a citizen of the United States, residing at Quincy, in the county of Adams and State of Illinois, have invented a new and useful Spring-Wheel, of which the following is a specification.

This invention pertains to spring wheels for vehicles and is designed more particularly for use on automobiles, which, from the nature of their construction and use, are heavy and strong and require very stout but elastic wheels to enable them to travel smoothly over the ground without unnecessary jarring motion.

To this end the object of the invention consists in providing between the hub and rim or felly of each wheel a series of broad spring metal spokes attached to the hub and rim in a novel manner, and approximately bow shaped to permit them to yield when meeting an obstruction or irregularity in the road. Combined with these bow shaped springs are a plurality of stiff spiral springs, the ends of each spring being connected to the hub and rim respectively by radially disposed connecting rods provided with means at one end of each spring for adjusting the tension of said spring.

With these and other objects in view the invention consists of certain novel features of construction, combination and arrangement of parts as will be hereinafter described and definitely pointed out in the claims.

In the accompanying drawings: Figure 1 is a side elevation of the wheel complete. Fig. 2 is a sectional view on the line 2—2 of Fig. 1 on an enlarged scale. Figs. 3 and 4 are enlarged detail sectional views on the lines 3—3 and 4—4 respectively of Fig. 2.

Similar numerals of reference indicate corresponding parts through the several figures of the drawings.

The numeral 1 denotes the hub of the wheel connected to the rim 2 by flat, broad spring spokes 3 and a number of spiral springs 4 connected to the hub and rim in radiating lines. The rim 2 is covered on its tread by a tire 5, which is used simply to prevent noise or as a muffler of noise, and may be made of any suitable material which will wear well and produce the results desired. One of the advantages of a wheel of this construction is the ability to obtain sufficient resiliency without using an inflatable or solid rubber tire, which are expensive and deteriorate rapidly.

The hub 1 may be made in various ways but in the form shown in the drawings it consists of a ring 6 of cast metal and of suitable width, on which are formed internal radial sockets 7 in which the ends of the spokes 3 are seated; and lugs 8 to which are attached the spiral springs 4 in a manner to be hereinafter described. A plate 9 closes each end of the ring 6, said plates which are circular, being securely fastened by through bolts or rivets 10. Rivets however are preferred as their ends can be headed on the outside of the circular plates 9 and the parts connected thereby held fast, while with bolts there is always a liability of their shaking loose. Between the disks 9, in the axis of the wheel is a tubular connection 12, the opening therein registering with the openings 11 in the disks. The axle around which the wheel revolves or to which it is fixed passes through these openings.

The sockets 7 are provided each with a radial opening 13 tapering inwardly from the periphery of the ring 6 a sufficient distance to securely hold the ends of the spokes 3. Each socket, be it understood, holds the ends of two spokes their adjacent faces being in contact in the center of the opening 13 and held in place by rivets 14 which fit in semi-circular recesses in the contacting faces of each spoke. The outer side of each spoke is beveled to fit sungly the opening 13.

The rim 2 is substantially as wide as the hub with parallel side faces 15, and a flat tread 16 covered by the tire 5 as hereinabove described. Radiating from the inner circumference of the rim 2 are a plurality of equally spaced ears 17, there being as many ears on each side of the rim as there are flat spring spokes in the wheel, and they are situated radially between the lugs 7 on the ring 6, that is to say, radial lines passing through the ear 17 would pass centrally between two radially disposed sockets 7. Through each pair of ears 17 extends a rivet 18 for securing a spoke to the rim of the wheel.

Each spoke 3 consists of a thin broad strip of spring steel bent flatwise at the center into an approximately semi-circle 19 and thence curving outwardly as at 20. The ends 21 having one side inclined are fitted into adjacent sockets 7 as clearly represented in Figs. 1 and 3. The semi-circular portion 19 of each spoke passes between the rim of the wheel and a rivet 18, bearing firmly against the inner circumference of the rim 2. A bushing 23 is secured in any suitable manner to the spoke 3 on each side through which the rivet 18 passes, by this means firmly securing the spoke to the rim of the wheel. Between the bushings 23 is a second bushing 24 to which a spiral spring 4 is attached as will be described later.

The lugs 8 on the inner circumference of the rim 6 are provided centrally of their width with openings 25 for the reception of bushings 26 similar to the bushings 24 carried on the rivets 18 at the rim of the wheel. Each spiral spring 4, made of stout resilient wire, is placed centrally between the curved ends of each spoke, the outer end of the spring engaging in the loop 27 or fastened in any other suitable manner on a rod 28 attached to the bushing 24. The other end of the spring is connected by a rod 29 to the bushing 26 secured to the hub 1. Where the rod 29 is attached to the spring 4 an adjusting device is provided for tensioning the spring, such for instance as that shown in the drawings, which consists of two nuts 30 and 31 threaded on the end of the rod 29 which passes through a hole made in the end of the spring. Attention is called to the fact that while this form of adjusting mechanism is shown in the drawings any other suitable means may be substituted therefor.

A wheel such as above described belongs to the class of suspension wheels, as the greater part of the weight upheld by the axle is supported by the spiral springs 4 above the axle, the plate springs 3 of course carry a portion of the weight whether they be above, below or at the sides of the axle. The spokes 3 are thin but broad so as to allow the hub to move in any direction irrespective of the rim, within certain limitations, and to have ample stiffness in a lateral direction; they act as drivers for the wheel and assist greatly in giving necessary resiliency as the spokes in the lower half of the wheel bend outwardly, while those above the axle tend to straighten out under the same conditions.

Having thus described the invention what is claimed is:—

1. In a wheel, the combination with a hub and a rim, of a plurality of plate spring spokes connecting the hub to the rim, and a plurality of coil suspension springs also attached to the hub and to the rim and alternating with said plate spring spokes.

2. In a wheel, the combination with a hub and a rim, of a plurality of plate spring spokes connecting said hub to said rim, each spoke consisting of a thin broad plate of spring metal bent flatwise at its center and connected to the rim, the ends being bent towards each other and secured to the hub, each of said ends having a common fastening with an end of the adjacent spoke.

3. In a wheel, the combination with a hub and a rim, of a plurality of plate spring spokes connecting said hub to said rim, each of said spokes consisting of a thin broad plate of spring metal bent flatwise at its center into an approximate semi-circle, each spoke being attached at its center to the rim by a rivet and at its ends to the hub, an end of two adjacent spokes being seated in the same socket.

4. In a wheel, the combination with a hub and a rim, of a plurality of plate spring spokes connecting said hub to said rim, each of said spokes being formed of a thin, broad strip of spring metal approximately U-shaped, bushings attached to the center of said spring and connected to the rim by a rivet passing through said bushings and rim, the opposite ends of said spoke being seated in different sockets in the hub of the wheel and secured therein with the ends of adjacent spokes.

5. In a wheel, the combination with a hub and a rim, plate spring spokes connecting said hub and rim and a coiled suspension spring situated between the curved sides of each of said spring spokes and connected at one end to the hub and at the other end to the rim, and means for varying the tension of said spring.

In testimony that I claim the foregoing as my own, I have hereto affixed my signature in the presence of two witnesses.

CHESTER LE ROY ANDERSON.

Witnesses:
FRANK J. WINGERT,
ROBT. B. BAGBY.